United States Patent
Hirvonen et al.

(10) Patent No.: US 9,639,273 B2
(45) Date of Patent: May 2, 2017

(54) METHOD AND APPARATUS FOR REPRESENTING CONTENT DATA

(75) Inventors: Ari-Pekka Hirvonen, Helsinki (FI); Lauri Rauhanen, Helsinki (FI); Aapo Matias Hasu, Tampere (FI); Jari Tapio Ijäs, Espoo (FI); Rit Mishra, Helsinki (FI); Jonatan Hedberg, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 594 days.

(21) Appl. No.: 13/050,348

(22) Filed: Mar. 17, 2011

(65) Prior Publication Data

US 2012/0198343 A1 Aug. 2, 2012

Related U.S. Application Data

(60) Provisional application No. 61/438,031, filed on Jan. 31, 2011.

(51) Int. Cl.
*G06F 15/177* (2006.01)
*G06F 3/06* (2006.01)
*G06F 3/01* (2006.01)

(52) U.S. Cl.
CPC ............ *G06F 3/0605* (2013.01); *G06F 3/067* (2013.01); *G06F 3/0652* (2013.01)

(58) Field of Classification Search
CPC ....... G06F 3/0605; G06F 3/0652; G06F 3/067
USPC ................ 715/734, 735, 736, 737, 738, 739
See application file for complete search history.

(56) References Cited

U.S. PATENT DOCUMENTS

| | | | |
|---|---|---|---|
| 6,580,431 B1 * | 6/2003 | Deosaran et al. | 345/503 |
| 6,611,952 B1 * | 8/2003 | Prakash et al. | 716/102 |
| 6,816,071 B2 | 11/2004 | Conti | |
| 7,046,254 B2 | 5/2006 | Brown et al. | |
| 7,290,259 B2 * | 10/2007 | Tanaka et al. | 718/1 |
| 7,519,814 B2 * | 4/2009 | Rochette et al. | 713/167 |
| 8,051,389 B2 * | 11/2011 | Hallisey et al. | 715/853 |
| 8,218,177 B2 * | 7/2012 | Lazarus | 358/1.15 |
| 8,271,988 B2 * | 9/2012 | Lazarus | 718/104 |
| 2005/0090911 A1 * | 4/2005 | Ingargiola et al. | 700/36 |
| 2007/0288485 A1 | 12/2007 | Shin et al. | |
| 2008/0005695 A1 * | 1/2008 | Ozzie et al. | 715/811 |
| 2009/0125911 A1 * | 5/2009 | Lazarus | 718/104 |
| 2009/0144741 A1 * | 6/2009 | Tsuda et al. | 718/104 |

(Continued)

FOREIGN PATENT DOCUMENTS

WO WO 2006/052413 A1 5/2006

OTHER PUBLICATIONS

"HS CleanDisk Pro 6.17" Yenicag Bilisim Ltd., Aug. 29, 2008, pp. 1-2.

(Continued)

*Primary Examiner* — Nicholas Augustine

(74) *Attorney, Agent, or Firm* — Ditthavong & Steiner, P.C.

(57) ABSTRACT

An approach is provided for representing content data. The cleanup manager determines one or more data types of content associated with a device. Next, the cleanup manager determines effect information regarding one or more effects on one or more resources of the device with respect to the one or more data types. Then, the cleanup manager presents one or more representations of the one or more data types, wherein the one or more representations are based, at least in part, on the effect information.

20 Claims, 10 Drawing Sheets

(56) References Cited

U.S. PATENT DOCUMENTS

| | | | |
|---|---|---|---|
| 2009/0327962 A1* | 12/2009 | Betts-LaCroix et al. | 715/833 |
| 2010/0031157 A1* | 2/2010 | Neer et al. | 715/738 |
| 2010/0318575 A1* | 12/2010 | Murphy et al. | 707/802 |
| 2010/0333028 A1* | 12/2010 | Welsh et al. | 715/833 |
| 2011/0116108 A1* | 5/2011 | Ha et al. | 358/1.2 |
| 2011/0154236 A1 | 6/2011 | Stoeck et al. | |

OTHER PUBLICATIONS

International Search Report for related International Application No. PCT/FI2011/051125 dated Mar. 22, 2012, pp. 1-4.
International Written Report for related International Application No. PCT/FI2011/051125 dated Mar. 22, 2012, pp. 1-6.

* cited by examiner

METHOD AND APPARATUS FOR REPRESENTING CONTENT DATA

RELATED APPLICATIONS

This application claims the benefit of the earlier filing date under 35 U.S.C. §119(e) of U.S. Provisional Application Ser. No. 61/438,031 filed Jan. 31, 2011, entitled "Method and Apparatus for Representing Content Data," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of development has been in mobile devices. For example, recent technological advances have enabled mobile devices to carry out many, if not nearly all, of the computing capabilities desired by consumers. Modern mobile devices, such as mobile phones, can now be utilized to browse the Internet, run sophisticated applications, play games, music, and movies, capture audio, images, or videos, read books, communicate with others, store thousands of data files, and so much more. However, the ability of the modern mobile device to perform such numerous tasks does not come without a downside. As mobile device users carry out these tasks (e.g., surfing the Internet, running applications, playing games, reading books, chatting with other users, storing data files, etc.) on their mobile devices, they may notice that their devices gradually or suddenly become slower in responding to commands. Unfortunately, many of these users may not understand the cause of their mobile devices' gradual or sudden sluggish performance, limiting their ability to resolve these performance issues. As a result, these mobile device users may become frustrated with their devices, as well as any related service providers or device manufacturers.

SOME EXAMPLE EMBODIMENTS

Therefore, there is a need for an approach for effectively representing content data.

According to one embodiment, a method comprises determining one or more data types of content associated with a device. The method also comprises determining effect information regarding one or more effects on one or more resources of the device with respect to the one or more data types. The method further comprises presenting one or more representations of the one or more data types, wherein the one or more representations are based, at least in part, on the effect information.

According to another embodiment, an apparatus comprises at least one processor, and at least one memory including computer program code, the at least one memory and the computer program code configured to, with the at least one processor, cause, at least in part, the apparatus to determine one or more data types of content associated with a device. The apparatus is also caused to determine effect information regarding one or more effects on one or more resources of the device with respect to the one or more data types. The apparatus is further caused to present one or more representations of the one or more data types, wherein the one or more representations are based, at least in part, on the effect information.

According to another embodiment, a computer-readable storage medium carries one or more sequences of one or more instructions which, when executed by one or more processors, cause, at least in part, an apparatus to determine one or more data types of content associated with a device. The apparatus is also caused to determine effect information regarding one or more effects on one or more resources of the device with respect to the one or more data types. The apparatus is further caused to present one or more representations of the one or more data types, wherein the one or more representations are based, at least in part, on the effect information.

According to another embodiment, an apparatus comprises means for determining one or more data types of content associated with a device. The apparatus also comprises means for determining effect information regarding one or more effects on one or more resources of the device with respect to the one or more data types. The apparatus further comprises means for presenting one or more representations of the one or more data types, wherein the one or more representations are based, at least in part, on the effect information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based, at least in part, on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: a method or an apparatus comprising means for performing the method of any of originally filed claims 1-20.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for representing content data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "content" may refer to any data included or associated with a device. Although various embodiments are described with respect to mobile devices, it is contemplated that the approach described herein may be used with any type of device including, but not limited to, televisions, gaming consoles, appliances, automobiles, personal computers (PCs), workstations, servers, mainframes, supercomputers, or a combination thereof.

Figure 1:
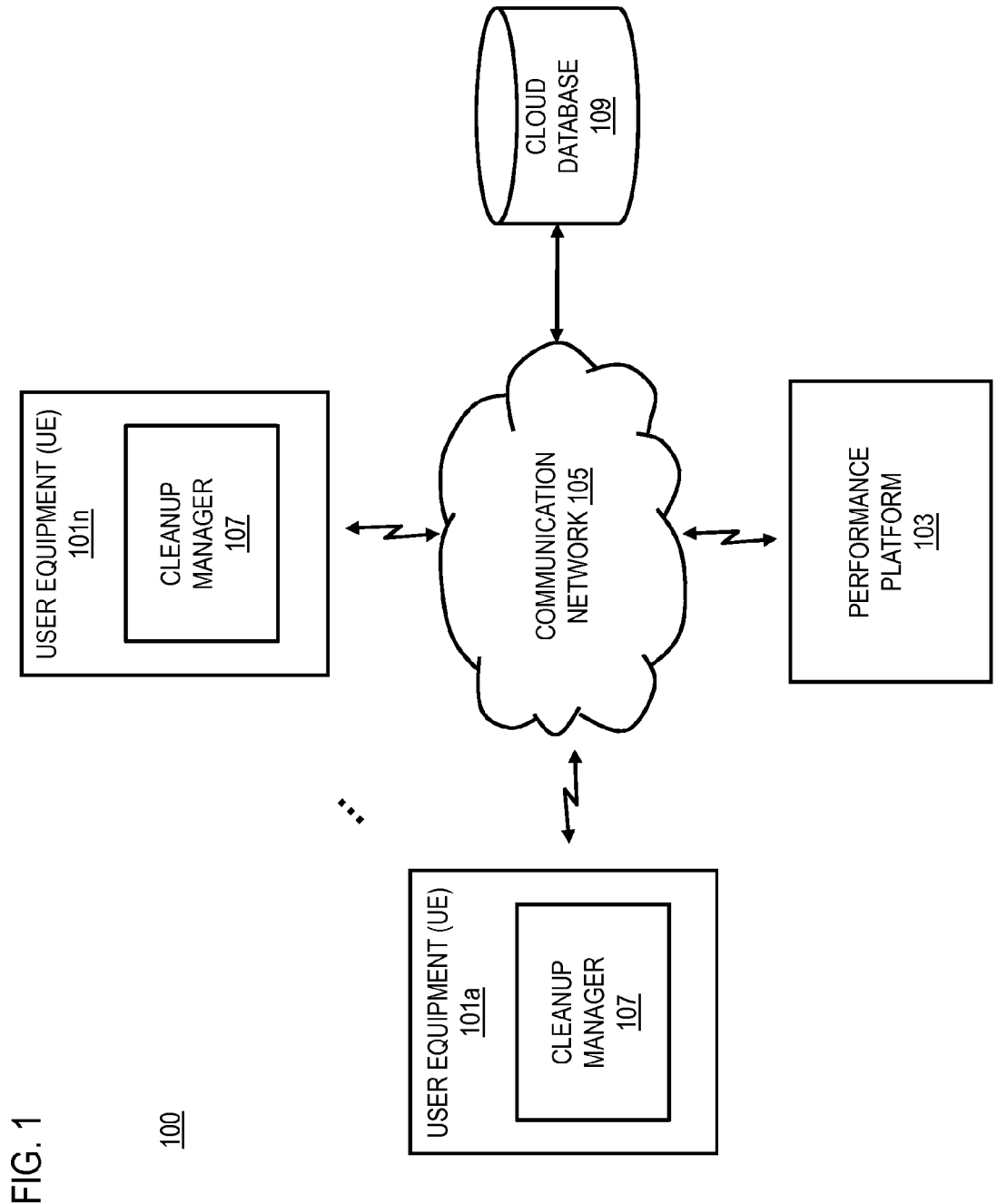
FIG. 1 is a diagram of a system capable of representing content data, according to one embodiment.

FIG. 1 is a diagram of a system capable of representing content data, according to one embodiment. Due to recent technological advances, it has been increasingly popular to utilize mobile devices, such as mobile phones, to accomplish many tasks previously monopolized by other non-mobile devices. Such tasks include allowing mobile device users to browse the Internet, run sophisticated applications, play games, music, and movies, capture audio, images, or videos, read books, communicate with others, store thousands of data files, etc. However, as with non-mobile devices, performing and handling extensive number of operations may cause a mobile device to respond slower to user commands, demonstrate significant lag time in running tasks, or even appear stagnant to users. Mobile device users may not understand what causes their devices to perform sluggishly, restraining their ability to prevent or counteract the reduced performance. For example, some users may believe that a lack of significant free storage space causes performance problems. As such, in an attempt to augment device performance, these users may not make use of unutilized storage resources or delete valuable data files (e.g., work documents, e-books, music, on-the-go movies, etc.). Nevertheless, because the availability of free storage space is only one factor in device performance, these users may still experience or continue to experience substantial performance issues.

To address this problem, a system 100 of FIG. 1 introduces the capability to determine the impact of particular data types of content on devices and then represent the impact, for instance, to users. Specifically, the system 100 may present representations of the data types to the user based on effect information regarding the effects the data types have on device resources. By way of example, the data types may be determined based on file extensions (e.g., .jpg, .exe, .html, etc.), user-defined or predefined tags (e.g., messaging, music, temporary files, contacts, notes, bookmarks, applications, photos, videos, etc.), or other labelling systems. The device resources may include memory storage resources, processing resources, bandwidth resources, or other resources. The effects may include a reduction in the responsiveness of the device, the device applications, device processes, or other effects. To present the representations based on the effect information, the system 100 may process the effect information to determine appropriate characteristics for the representations. These characteristics may include graphical characteristics, textual characteristics, audio characteristics, haptic characteristics, or other characteristics.

In one sample use case, textual labels may be utilized to represent certain data types, such as messages, music, temporary files, contacts, notes, bookmarks, applications, photos, videos, etc. Assuming that the user has a large collection of music on the user device and a small collection of videos, the presentation of the data type representations may illustrate a substantially larger textual label for music in comparison to the textual label for videos. It is noted that even if the user's video collection may take up more storage space on the user device than the user's music collection, the textual label for music may still be larger than the textual label for videos. For example, although the music collection may take up less storage space (e.g., 5 GB for 1000 music files, 8 GB for 8 video files), the calculated effect that the music collection may have on device resources may be significantly more than the calculated effect that the video collection has on device resources.

In certain embodiments, the data types may be categorized based on the affected resources. By way of example, the data types may be categorized based on whether they affect the device's memory storage resources, processing resources, bandwidth resources, etc., such as whether they affect the availability of such resources. Moreover, the categories may be divided into one or more levels of subcategories. For example, the category of memory storage resources may further be broken into subcategories of temporary storage, permanent storage, etc. The temporary storage subcategory may further be divided into subcategories of cache memory, main memory, video memory, etc. The physical storage subcategory may further be divided into subcategories of internal storage, Secure Digital (SD) memory card storage, cloud storage, etc. Upon display of the data type representations, the representations may be presented based on such categorization.

In one embodiment, the presentation of the data type representations may be divided based on the effects that the data types have on each category (or sub-category) of affected resources. The presentation may include, for instance, a first section for representations of data types that affect the device's internal storage, a second section for representations of data types that affect the device's SD memory card storage, and a third section for representations of data types that affect the device's cloud storage. In another embodiment, the presentation of each data type representation may illustrate the combined effect that the data type has on one or more categories (or subcategories). In a further embodiment, the presentation of each data type representations may be based on which categories (or subcategories) of resources the particular data type affects. By way of example, in determining the effect information from which the presentation may be based, cache memory utilization may be given more weight when calculating the effect that a data type has on resources than main memory utilization because cache memory may be determined to be a more critical resource than main memory due to the significant difference in temporary storage space. Assuming that the effects on resources are based on a point system, for instance, cache memory utilization may be given 1 effect point for every megabyte (MB) of utilized space while main memory utilization may be given 1 effect point for every hundred MB of utilized space. Thus, for demonstrate purposes, a representation presented for a data type that only utilizes 1 MB of cache memory may be, for instance, the same size as a representation presented for a data type that only utilizes 100 MB of main memory.

More specifically, the system 100 may determine one or more data types of content associated with a device. The determination of the one or more data types may be based on file extensions (e.g., .jpg, .exe, .html, etc.), user-defined or predefined tags (e.g., messaging, music, temporary files, contacts, notes, bookmarks, applications, photos, videos, etc.), or other labelling systems. The system 100 may then determine effect information regarding one or more effects on one or more resources of the device with respect to the one or more data types. The one or more resources of the device may include memory storage resources, processing resources, bandwidth resources, or other resources. The effects may include a reduction in the responsiveness of the device, the device applications, device processes, or other effects. The system 100 may further present one or more representations of the one or more data types, wherein the one or more representations are based, at least in part, on the effect information. In presenting the one or more representations, the effect information may be processed to determine one or more characteristics of the one or more representations, such as graphical characteristics, textual characteristics, audio characteristics, haptic characteristics, or other characteristics.

As shown in FIG. 1, the system 100 comprises a user equipment (UE) 101 or multiple UEs 101a-101n (or UEs 101) having connectivity to a performance platform 103 via a communication network 105. The UE 101 may include or have access to a cleanup manager 107 to provide the user of the UE 101 with an understanding of what content on the device may be causing a reduced responsiveness of the UE 101, its applications, its processes, etc. For example, the cleanup manager 107 may be included with the UEs 101 as shown, or the cleanup manager 107 may be provided and handled by the performance platform 103. Further, the UEs 101 or the performance platform 103 may include or have access to a storage database, such as a cloud database 109. As such, the UE 101 may store or access content locally or through the cloud database 109. Accordingly, in certain embodiments, the cleanup manager 107 may examine the effects that the data types of content stored or accessed locally, or through the cloud database 109, have on device resources in determining the effect information.

In one sample use case, users of the UEs 101 may share videos on the cloud database 109 with other users of other UE 101s. To view the shared videos located at the cloud database 109, the user or the other users may use a social application stored locally at their respective UE 101s. When the social application is utilized to view the shared videos, the cleanup manager 107 may, for instance, determine the effect information based on the effects of the social application on memory storage resources (e.g., through the storage of application or temporarily files), processing resources (e.g., viewing the videos), bandwidth resources (e.g., streaming the videos), or a combination thereof. Assuming that the social application is consistently active (e.g., via widget notifications) and is frequently used to view videos or other shared online content, the cleanup manager 107 may then present large graphical representations of the application data type and the temporary files data type to the user. It is noted that the cleanup manager 107 may also present a large graphical representation of the video data type for a particular UE 101, for instance, if the cloud database 109 is considered a resource of the particular UE 101.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the cleanup manager 107 may determine one or more suggestions for mitigating at least one of the one or more effects on the one or more resources. The cleanup manager 107 may then present the one or more suggestions. In one sample use case, the cleanup manager 107 may determine and present the one or more suggestions to the user when utilization of device resources reaches one or more threshold values, wherein the one or more threshold value may be predetermined values set by default, by applications, by the user, etc. The one or more suggestions may include, for instance, a tip to move, delete, or compress certain content. For example, if the internal storage space of the UE 101 is almost completely full, the cleanup manager 107 may present the user with a suggestion to delete old messages or move the messages to the cloud database 109. In another sample use case, the cleanup manager 107 may determine and present the one or more suggestions to the user upon detecting some user action. The user action may include, for instance, moving, deleting, or compressing content of a particular data type. For example, if a user deletes an old bookmark, the cleanup manager 107 may present the user with a suggestion to delete other old bookmarks that have not been use for some predetermined time.

In another embodiment, the cleanup manager 107 may determine other effect information based on a hypothetical scenario where at least one of the one or more suggestions is implemented. The cleanup manager 107 may then present one or more other representations of the one or more data types, wherein the one or more other representations are based on the other effect information. Moreover, the cleanup manager 107 may further process the other effect information to determine one or more characteristics of the one or more other representations. These characteristics may include graphical characteristics, textual characteristics, audio characteristics, haptic characteristics, or other characteristics. By way of example, if the one or more suggestions include a tip to delete old messages and old bookmarks, the tip may also provide a preview of what the representations would look like if old message were deleted, a preview of what the representations would look like if the old bookmarks were deleted, or a combination thereof. As such, the user may be presented with one or more previews for the one or more suggestions.

In another embodiment, the cleanup manager 107 may determine at least one change to the content, the one or more data types, the one or more effects, the one or more resources, or a combination thereof, wherein the determination of the effect information is initiated based on the at least one change. By way of example, the user may desire the ability to reorganize the presentation of the one of more data types. As such, the cleanup manager 107 may allow the user to redefine or combine representations to the user's preferences. As an example, the current representations may be textual representations of the following data types: messaging, music, temporary files, contacts, notes, bookmarks, applications, photos, and videos. To limit the number of representations, the user may combine, for instance, certain representations of data types that the user believes will not have a significant effect on device performance, such as notes and bookmarks. Accordingly, the effect information may thereafter be determined based on the new combined representation.

In another embodiment, the cleanup manager 107 may determine one or more threshold values for the one or more effects. The cleanup manager 107 may further process the effect information and the one or more threshold values to present an alert notification. As discussed, the one or more threshold value may be predetermined values set by default, by applications, by the user, etc. The alert notification may include, for instance, a warning that the effects on device resources have reached a particular threshold value, a suggestion to take some action, etc.

By way of example, the UE 101 and the performance platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
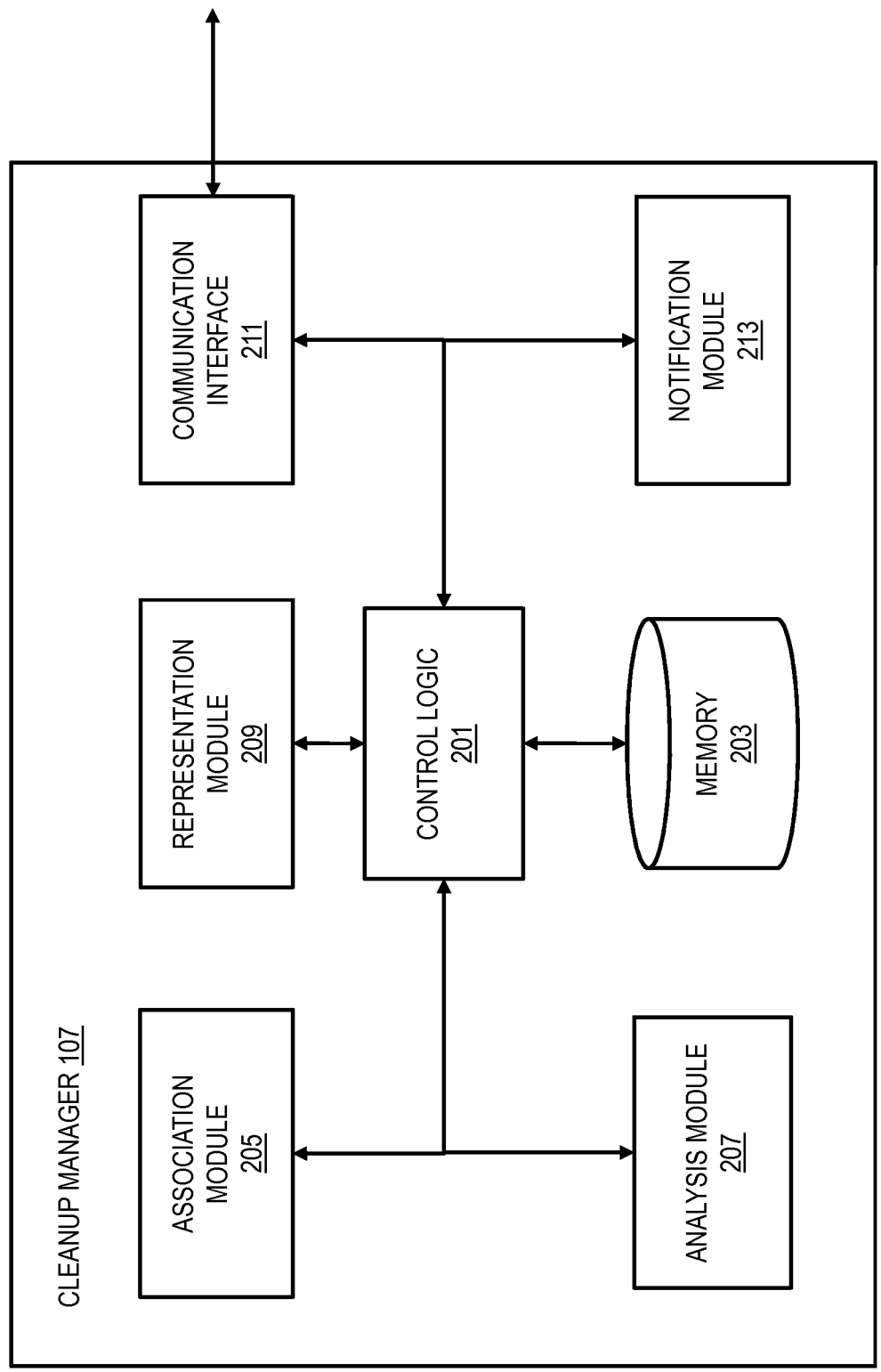
FIG. 2 is a diagram of the components of a cleanup manager, according to one embodiment.

FIG. 2 is a diagram of the components of a cleanup manager, according to one embodiment. By way of example, the cleanup manager 107 includes one or more components for providing representation of content data. It is contemplated that the functions of these components may be combined in one or more components or performed by other components of equivalent functionality. In this embodiment, the cleanup manager 107 includes control logic 201, memory 203, an association module 205, an analysis module 207, a representation module 209, a communication interface 211, and a notification module 213.

The control logic 201 executes at least one algorithm for executing functions of the cleanup manager 107. For example, the control logic 201 interacts with the association module 205 to determine the one or more data types of content associated with the UE 101. As discussed, the determination may be based on file extensions (e.g., .jpg, .exe, .html, etc.), user-defined or predefined tags (e.g., messaging, music, temporary files, contacts, notes, bookmarks, applications, photos, videos, etc.), or other labelling systems. In one embodiment, the control logic 201 may then store or update the one or more data types, for instance, in a table in the memory 203 for future use.

Next, the control logic 201 directs the analysis module 207 to determine effect information regarding one or more effects on one or more resources of the device with respect to the one or more data types. In doing so, the analysis module 207 may take many factors into account. For example, the device resources that may be factored in such determination include memory storage resources, processing resources, and bandwidth resources. The effects that may be factored in such determination include a reduction in the responsiveness of the device, the device applications, and device processes.

Then, the control logic 201 works with the representation module 209 to present one or more representations of the one or more data types based on the effect information provided by the analysis module 207. As provided, the representation module 209 may process the effect information to determine appropriate characteristics for the one or more representations. These characteristics may include graphical characteristics, textual characteristics, audio characteristics, haptic characteristics, or other characteristics.

The control logic 201 also utilizes the communication interface 211 to communicate with other components of the UE 101, other UEs 101, the performance platform 103, and other components of the system 100. The communication interface 211 may include multiple means of communication. For example, the communication interface 211 may be able to communicate over SMS, internet protocol, instant messaging, voice sessions (e.g., via a phone network), or other types of communication.

The control logic 201 further employs the notification module 213 to provide one or more notifications to the user. For example, the notification module 213 may present one or more suggestions to the user for mitigating at least one of the one or more effects on the one or more device resources in the form of notifications. Moreover, the notification module 213 may present alert notifications to the user, for instance, when the one or more effects reaches one or more threshold values either predetermined by default, by applications, by the user, etc.

Figure 3:
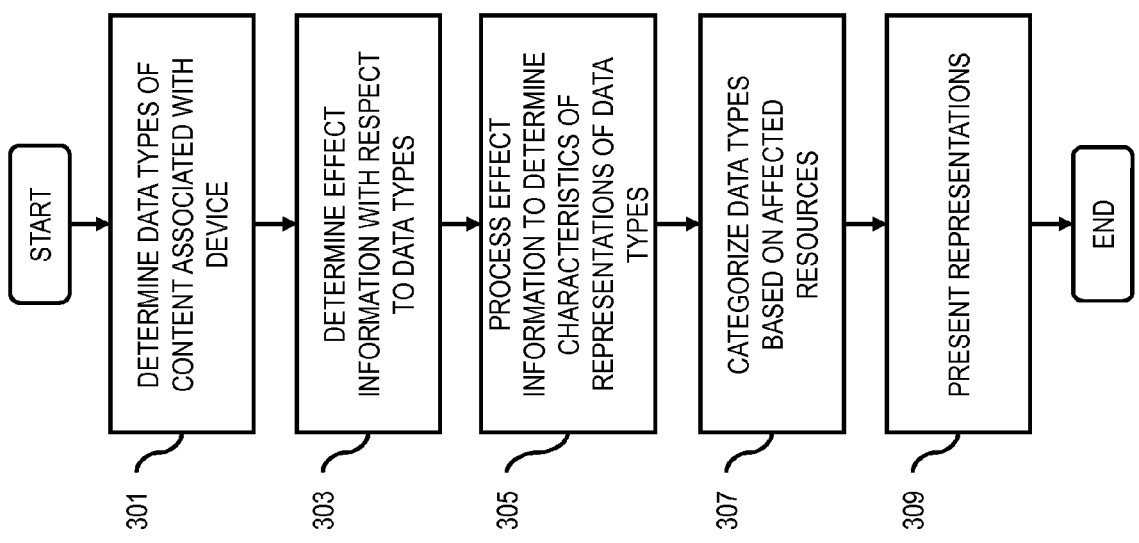
FIG. 3 is a flowchart of a process for representing content data, according to one embodiment.
Figure 7:
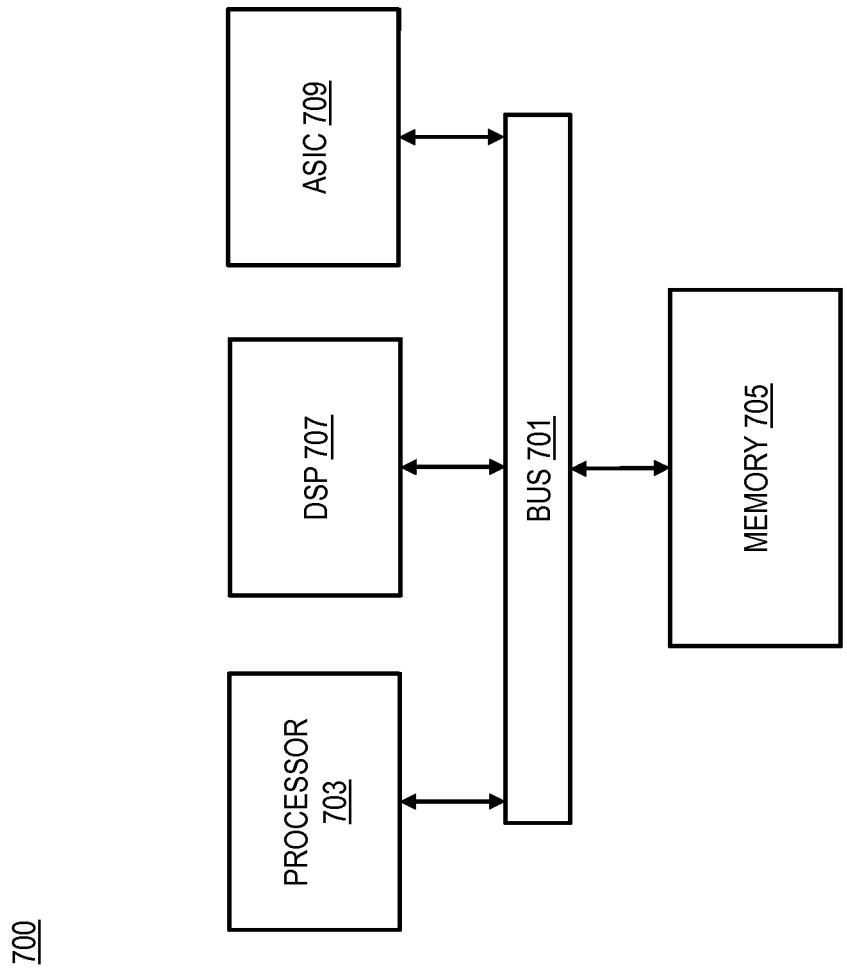
FIG. 7 is a diagram of a chip set that can be used to implement an embodiment of the invention.

FIG. 3 is a flowchart of a process for representing content data, according to one embodiment. In one embodiment, the cleanup manager 107 performs the process 300 and is implemented in, for instance, a chip set including a processor and a memory as shown in FIG. 7. As such, the control logic 201 can provide means for accomplishing various parts of the process 300 as well as means for accomplishing other processes in conjunction with other components of the cleanup manager 107.

In step 301, the control logic 201 determines one or more data types of content associated with a device. As provided, the determination may be based on file extensions (e.g., .jpg, .exe, .html, etc.), user-defined or predefined tags (e.g., messaging, music, temporary files, contacts, notes, bookmarks, applications, photos, videos, etc.), or other labelling systems. Further, the determined one or more data types may be stored for future use.

In step 303, the control logic 201 then determines effect information regarding one or more effects on one or more resources of the device with respect to the one or more data types. As mentioned, there may be many factors that go into the determination of the effect information. With respect to the one or more device resources, the factors may include memory storage resources, processing resources, bandwidth resources, etc. With respect to the one or more effects, the factors may include a reduction in the responsiveness of the device, the device applications, device processes, etc. The control logic 201 further processes, in step 305, the effect information to determine one or more characteristics of the one or more representations of the one or more data types. Such characteristics include graphical characteristics, textual characteristics, audio characteristics, haptic characteristics, or other characteristics. As an example, those data types determined to have a substantial effect on the one or more resources may be represented by visually darker representations than those of data types determined to have an insignificant effect on the one or more resources. As another example, those data types determined to have a substantial effect on the one or more resources may be represented by visually larger representations than those of data types determined to have an in significant effect on the one or more resources.

In step 307, the control logic 201 then categorizes the one or more data types based on affected ones of the one or more resources. As discussed, the data types may be categorized based on whether they affect the device's memory storage resources, processing resources, bandwidth resources, etc., such as whether they affect the availability of such resources. Moreover, the categories may be divided into one or more levels of subcategories. For example, the category for memory storage resources may further be broken into subcategories of temporary storage, permanent storage, etc. The temporary storage subcategory may further be divided into subcategories of cache memory, main memory, video memory, etc. The physical storage subcategory may further be divided into subcategories of internal storage, Secure Digital (SD) memory card storage, cloud storage, etc.

In step 309, the control logic 201 then presents the one or more representations based on the determination of the one or more characteristics and the categorization of the one or more data types. The presentation may include, for instance, a first section for representations of data types that affect the device's internal storage, a second section for representations of data types that affect the device's SD memory card storage, and a third section for representations of data types that affect the device's cloud storage. As such, representations of the same data type may be different in the various different sections. In one sample use case, a representation of a reading data type in one section might be larger in size than another representation of the reading data type in another section. In such a case, the difference may be because the reading data type affects the one or more resources in various ways.

As provided, the effect information may also be determined based on the categorization of the one or more data types. As such, the processing of the effect information to determine the one or more characteristics of the one or more representations may also be based on the categorization of the one or more data types. Accordingly, the control logic 201 may then present the one or more representations based on such processing. In such a case, the presentation of each data type representations may be based on which categories (or subcategories) of resources the particular data type affects. By way of example, the determination of the effect information, from which the presentation may be based, may analyze utilization of one resource differently than a similar utilization of another resource. Assuming that the utilization of resources are based on an point system, for instance, utilization of cache memory may be given 1 effect point for every MB of utilized space while utilization of main memory may be given 1 effect point for every hundred MB of utilized space. Thus, for demonstrate purposes, a representation presented for a data type that only utilizes 1 MB of cache memory may be, for instance, the same size as a representation presented for a data type that only utilizes 100 MB of main memory.

Figure 4:
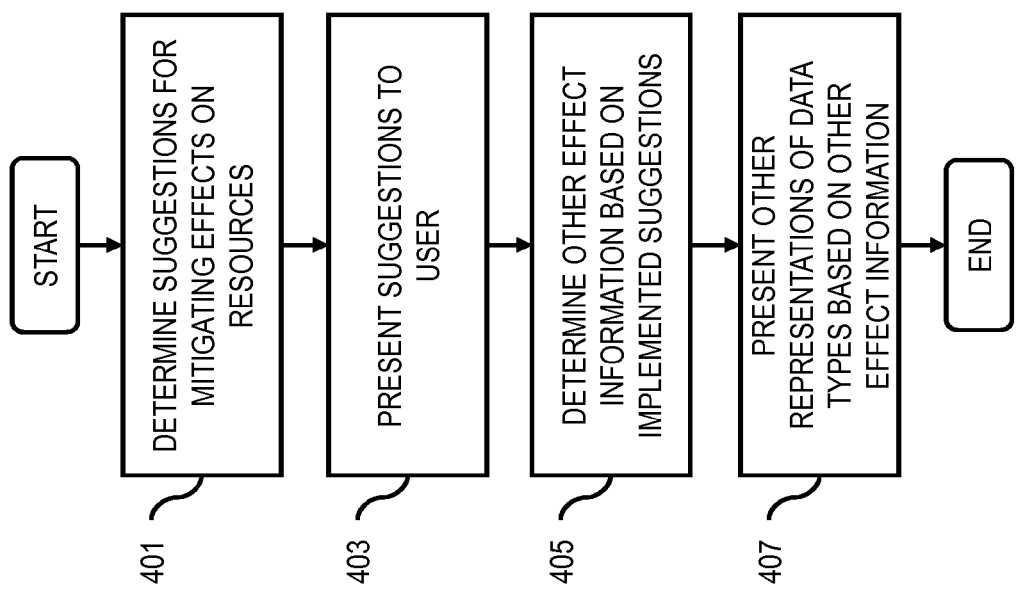
FIG. 4 is a flowchart of a process for providing effect-mitigating suggestions, according to one embodiment.

FIG. 4 is a flowchart of a process for providing effect-mitigating suggestions, according to one embodiment. In one embodiment, the cleanup manager 107 performs the process 400 and is implemented in, for instance, a chip set including a processor and a memory as shown in FIG. 7. As such, the control logic 201 can provide means for accomplishing various parts of the process 400 as well as means for accomplishing other processes in conjunction with other components of the cleanup manager 107.

In step 401, the control logic 201 determines one or more suggestions for mitigating at least one of the one or more effects on the one or more resources. The control logic 201 then presents, in step 403, the one or more suggestions, for instance, to the user. As explained above, in one embodiment, the determination and presentation of the one or more suggestions may be in response to detecting one or more threshold values of the one or more effects being reached, wherein the one or more threshold values may have been predetermined values set by default, by applications, by the user, etc. In another embodiment, the determination and presentation of the one or more suggestions may be in response to a user action, for instance, moving, deleting, or compressing content of a particular data type.

In step 405, the control logic 201 determines other effect information based on a hypothetical scenario where at least one of the one or more suggestions is implemented. The control logic 201 then presents, in step 407, one or more other representations of the one or more data types, wherein the one or more other representations are based on the other effect information. As mentioned, the cleanup manager 107 may also process the other effect information to determine one or more other characteristics of the one or more other representations. These other characteristics may include graphical characteristics, textual characteristics, audio characteristics, haptic characteristics, or other characteristics. By way of example, if the one or more suggestions include a tip to delete old messages and old bookmarks, the tip may also provide a preview of what the representations would look like if old message were deleted, a preview of what the representations would look like if the old bookmarks were deleted, or a combination thereof. Accordingly, the user may be presented with one or more previews for the one or more suggestions.

Figure 5A:
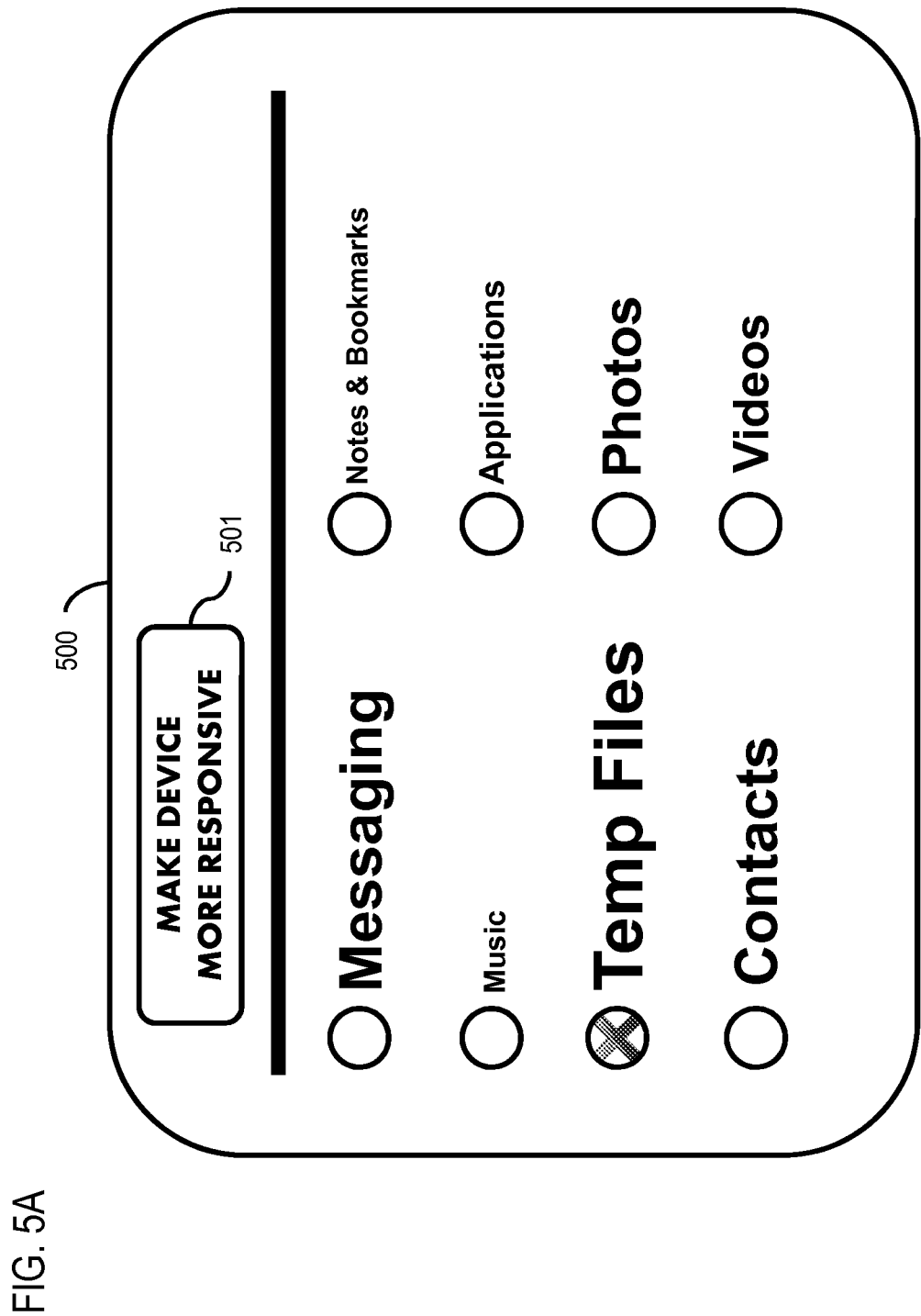
FIGS. 5A-5C are diagrams of user interfaces utilized in the processes of FIG. 3 and/or FIG. 4, according to various embodiments.
Figure 5B:
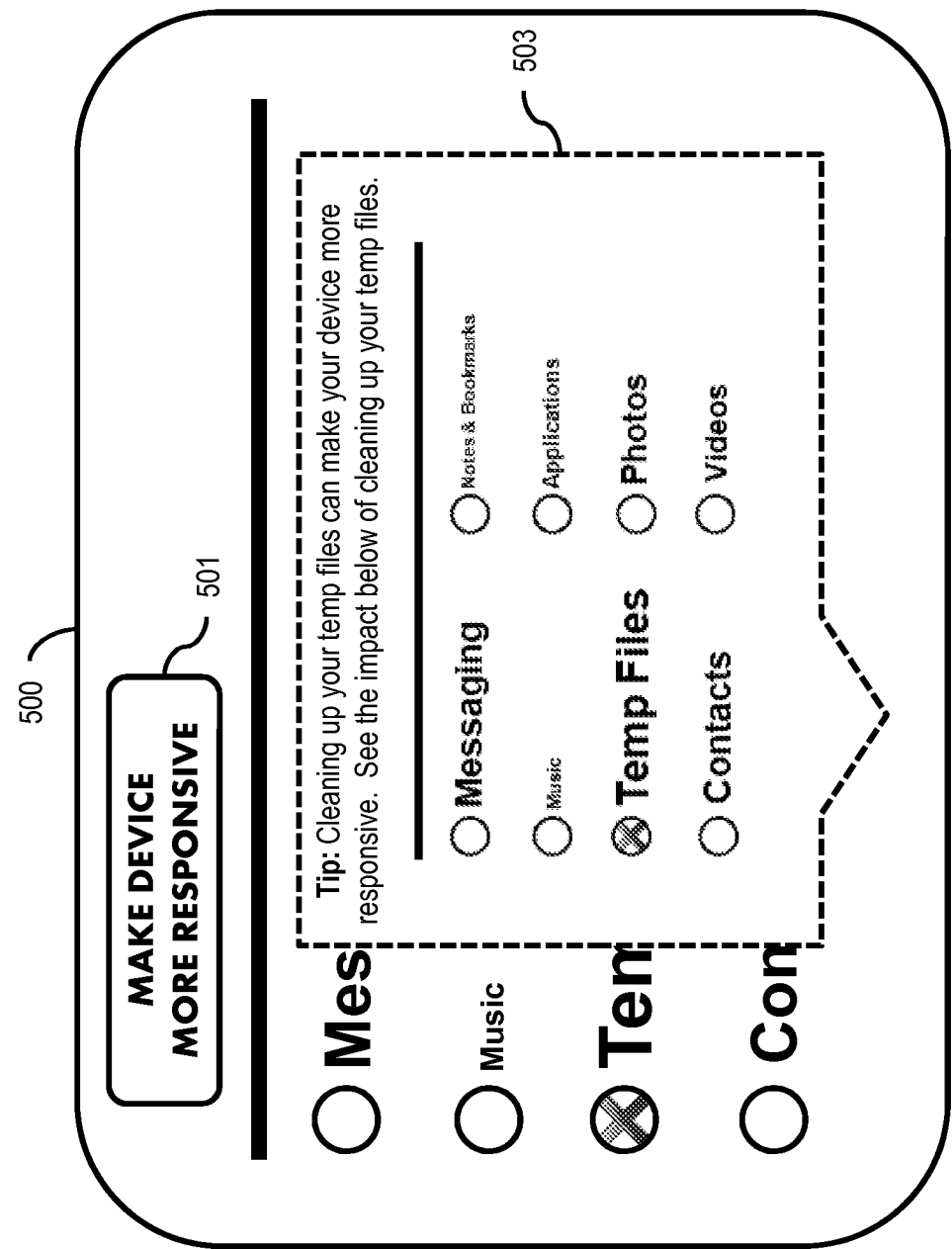
Figure 5C:
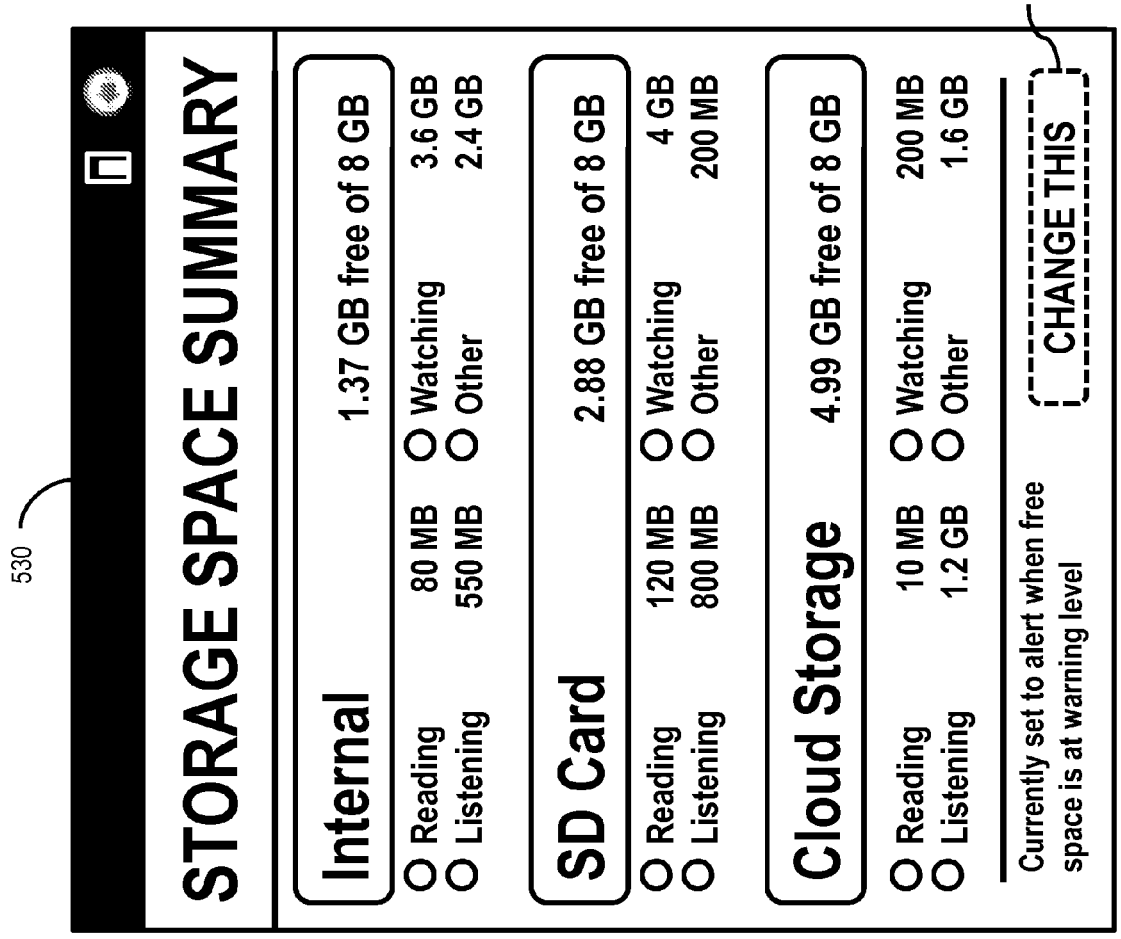

FIGS. 5A-5C are diagrams of user interfaces utilized in the processes of FIG. 3 and/or FIG. 4, according to various embodiments. FIG. 5A shows a user interface 500 that may allow a user to make the user device more responsive, for instance, by clicking a button 501. In this example, the user interface 500 presents selectable textual representations of data types (e.g., messaging, music, temporary files, contacts, notes, bookmarks, applications, photos, and videos) to the user. Here, the user has selected the temporary files data type to be processed. The user may then click the button 501 to process the temporary files data type. The processing of the temporary files data type may further be based on default settings, predetermined user preferences, user-selection of processing options, etc. Further, in FIG. 5A, it is noted that there is only one representation presented for notes and bookmarks. As explained previously, the user may desire the ability to reorganize the presentation of the one of more data types. As such, the user may be allowed to redefine or combine representations to the user's preferences. Here, the user may have combined the representations for the notes data type and the bookmarks data type, for instance, to limit the number of representations shown.

FIG. 5B shows the user interface 500 that may allow a user to make the user device more responsive, for instance, by clicking button 501. As in FIG. 5A, the user interface 500 presents selectable textual representations of data types (e.g., messaging, music, temporary files, contacts, notes, bookmarks, applications, photos, and videos) to the user. Here, the user has selected the temporary files data type to be processed. In addition, the user interface 500 has provided a suggestion 503 in the form of a tip telling the user that cleaning up the user's temporary files can make the user device more responsive. The tip further provides a preview demonstrating the impact that cleaning up the user's temporary files can make. As mentioned, the suggestion may have provided to the user based on a number of circumstances. The user interface 500 may have prompted the user with the suggestion, for instance, because the temporary files stored on the device may have reached a predetermined threshold value (e.g., the temporary file storage was almost completely full). Alternatively, the user interface 500 may have prompted the user with the suggestion because the user selected the temporary files data type to be processed. As such, the suggestion may have been provided to confirm to the user that such processing would increase the responsiveness of the device, applications of the device, processes of the device, etc.

FIG. 5C shows a user interface 530 that presents a summary relating to the storage space available to the user based on some of the affected resources (e.g., permanent memory storages). As illustrated, the data types (e.g., reading, listening, watching, and other) are categorized based on the resources that the data types affect. For example, the reading data type is currently utilizing 80 MB of internal storage, 120 MB of SD memory card storage, and 10 MB of cloud storage. The listening data type is currently utilizing 550 MB of internal storage, 800 MB of SD memory card storage, and 1.2 GB of cloud storage. The watching data type is currently utilizing 3.6 GB of internal storage, 4 GB of SD memory card storage, and 200 MB of cloud storage. The other data types are currently utilizing 2.4 GB of internal storage, 200 MB of SD memory card storage, and 1.6 GB of cloud storage. Moreover, as shown in FIG. 5C, the user interface 530 enables the user to set the threshold values for the various storage resources so that an alert notification may be presented when such threshold values are reached. In this case, the user may set, modify, or cancel the threshold values by clicking on a button 531.

The processes described herein for representing content data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
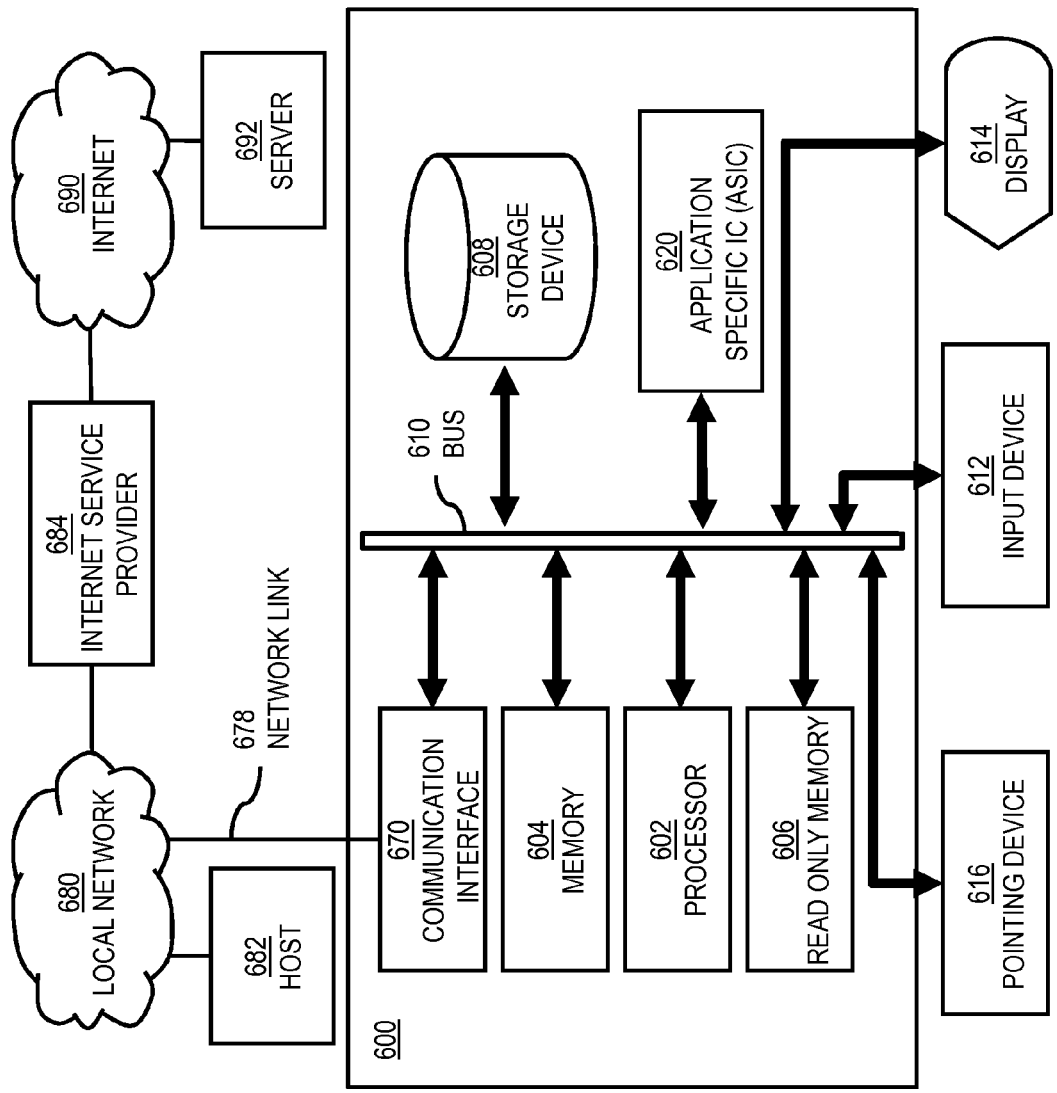
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to represent content data as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of representing content data.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to represent content data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for representing content data. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for representing content data, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for representing content data to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to represent content data as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of representing content data.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to represent content data. The memory 705 also stores the data associated with or generated by the execution of the inventive steps.

Figure 8:
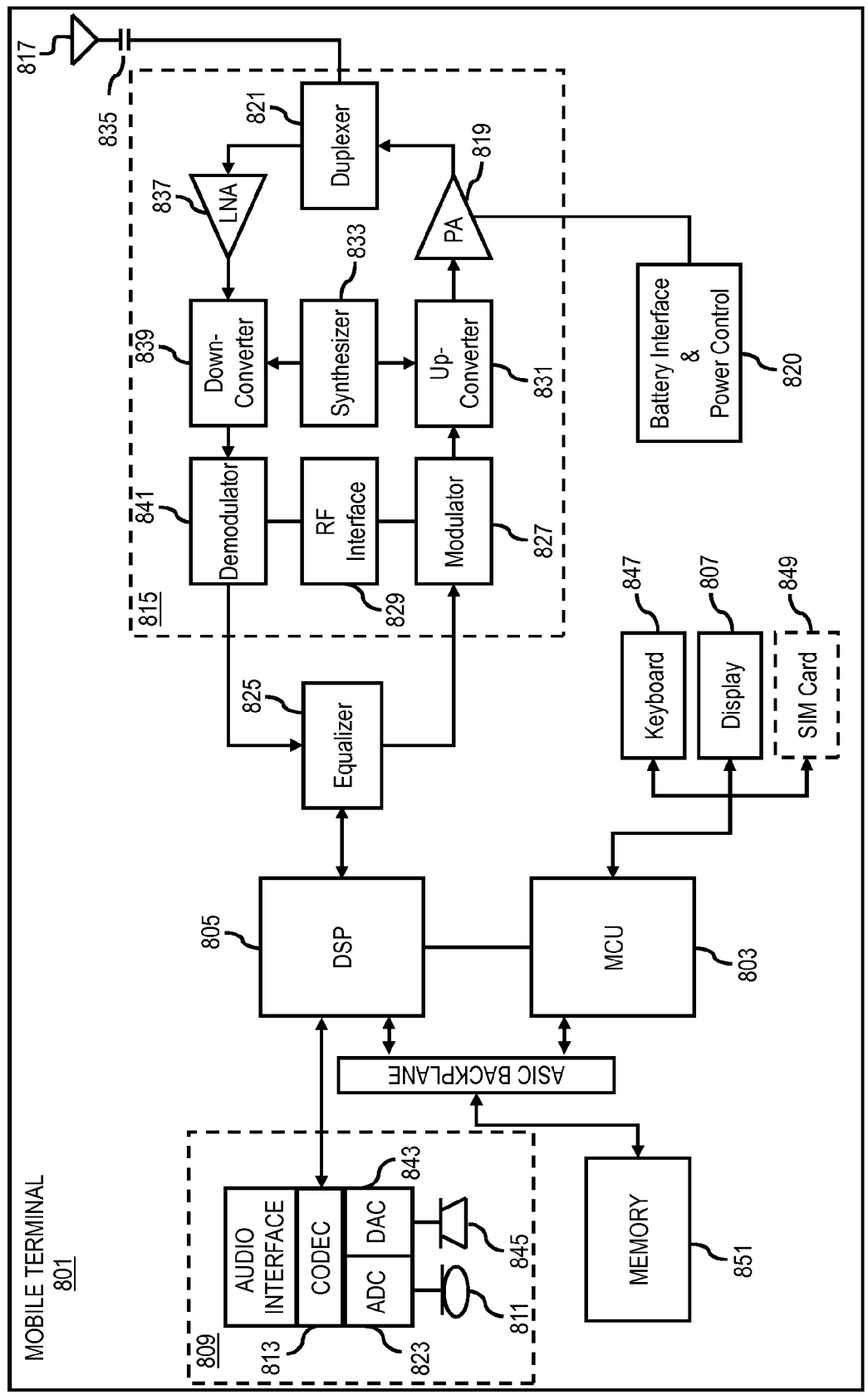
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of representing content data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of representing content data. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to represent representing content data content data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for representing content data about content associated with a device, the method comprising facilitating a processing of and/or processing (1) data and/or (2) information and/or (3) at least one signal, the (1) data and/or (2) information and/or (3) at least one signal based, at least in part, on the following:
    at least one determination, utilizing at least one processor, of one or more data types of the content associated with the device;
    at least one determination of effect information based on the one or more data types and one or more factors associated with the device regarding one or more effects on one or more resources of the device with respect to the one or more data types and the content, wherein the one or more factors include one or more effects associated with at least one of memory storage resources, processing resources, bandwidth resources and combinations thereof associated with the device,
    wherein the one or more effects include a reduction in a responsiveness of the device, one or more device applications, one or more device processes and combinations thereof associated with the device;
    at least one determination of a categorization the one or more data types based, at least in part, on the determined effect information and on affected ones of the one or more resources;
    at least one determination of at least one presentation of one or more representations of the one or more data types, wherein the one or more representations are based, at least in part, on the determined effect information,
    wherein the at least one presentation of one or more representations of the one or more data types include a comparative depiction differentiating between data types having a greater effect on the one or more resources; and
    at least one determination of one or more suggestions for user action for mitigating the reduction in responsiveness of the device based on at least one effect of the one or more effects based, at least in part, on the effect information and the categorization.

2. A method of claim 1,
    wherein the device is a mobile device,
    wherein the one or more resources include, at least in part, memory storage resources, processing resources, bandwidth resources, or a combination thereof.

3. A method of claim 1, wherein the (1) data and/or (2) information and/or (3) at least one signal are further based, at least in part, on the following:
    a processing of the effect information to determine one or more characteristics of the one or more representations.

4. A method of claim 3, wherein the one or more characteristics include, at least in part, one or more graphical characteristics, one or more textual characteristics, one or more audio characteristics, one or more haptic characteristics, or a combination thereof.

5. A method of claim 1,
wherein the at least one presentation of the one or more representations are based, at least in part, on the categorization.

6. A method of claim 1, wherein the
one or more suggestions are for mitigating at least one of the one or more effects on the one or more resources.

7. A method of claim 1, wherein the (1) data and/or (2) information and/or (3) at least one signal are further based, at least in part, on the following:
at least one determination of other effect information based, at least in part, on a hypothetical scenario where at least one of the one or more suggestions is implemented;
at least one presentation of one or more other representations of the one or more data types,
wherein the one or more other representations are based, at least in part, on the other effect information.

8. A method of claim 1, wherein the (1) data and/or (2) information and/or (3) at least one signal are further based, at least in part, on the following:
at least one change to the content, the one or more data types, the one or more effects, the one or more resources, or a combination thereof,
wherein the at least one determination of the effect information is initiated based, at least in part, on the at least one change.

9. A method of claim 1, wherein the (1) data and/or (2) information and/or (3) at least one signal are further based, at least in part, on the following:
one or more threshold values for the one or more effects; and
a processing of the effect information and the one or more threshold values to cause, at least in part, a presentation of an alert notification.

10. A method of claim 9, wherein the determination of and the presentation of the one or more suggestions is based on a detection of the one or more threshold values, wherein the threshold values are associated with the one or more effects having reached a predetermined value.

11. An apparatus for representing content data about content associated with a device, the apparatus comprising:
at least one processor; and
at least one memory including computer program code for one or more programs,
the at least one memory and the computer program code configured to, with the at least one processor, cause the apparatus to perform at least the following,
determine one or more data types of the content associated with the device,
determine effect information based on the one or more data types and one or more factors associated with the device regarding one or more effects on one or more resources of the device with respect to the one or more data types and the content,
wherein the one or more factors include one or more effects associated with at least one of memory storage resources, processing resources, bandwidth resources and combinations thereof associated with the device,
wherein the one or more effects include a reduction in a responsiveness of the device, one or more device applications, one or more device processes and combinations thereof associated with the device,
determine a categorization the one or more data types based, at least in part, on the determined effect information and on affected ones of the one or more resources,
cause, at least in part, a presentation of one or more representations of the one or more data types,
wherein the one or more representations are based, at least in part, on the determined effect information,
wherein the at least one presentation of one or more representations of the one or more data types include a comparative depiction differentiating between data types having a greater effect on the one or more resources, and
determine one or more suggestions for user action for mitigating the reduction in responsiveness of the device based on at least one effect of the one or more effects based, at least in part, on the effect information and the categorization.

12. An apparatus of claim 11,
wherein the device is a mobile device,
wherein the one or more resources include, at least in part, memory storage resources, processing resources, bandwidth resources, or a combination thereof.

13. An apparatus of claim 11, wherein the apparatus is further caused to:
process and/or facilitate a processing of the effect information to determine one or more characteristics of the one or more representations.

14. An apparatus of claim 13, wherein the one or more characteristics include, at least in part, one or more graphical characteristics, one or more textual characteristics, one or more audio characteristics, one or more haptic characteristics, or a combination thereof.

15. An apparatus of claim 11,
wherein the presentation of the one or more representations are based, at least in part, on the categorization.

16. An apparatus of claim 11, wherein the one or more suggestions are for mitigating at least one of the one or more effects on the one or more resources.

17. An apparatus of claim 11, wherein the apparatus is further caused to:
determine other effect information based, at least in part, on a hypothetical scenario where at least one of the one or more suggestions is implemented,
cause, at least in part, a presentation of one or more other representations of the one or more data types,
wherein the one or more other representations are based, at least in part, on the other effect information.

18. An apparatus of claim 11, wherein the apparatus is further caused to:
determine at least one change to the content, the one or more data types, the one or more effects, the one or more resources, or a combination thereof,
wherein the determination of the effect information is initiated based, at least in part, on the at least one change.

19. An apparatus of claim 11, wherein the apparatus is further caused to:
determine one or more threshold values for the one or more effects, and
process and/or facilitate a processing of the effect information and the one or more threshold values to cause, at least in part, a presentation of an alert notification.

20. An apparatus of claim 19, wherein the determination of and the presentation of the one or more suggestions is based on a detection of the one or more threshold values, wherein the threshold values are associated with the one or more effects having reached a predetermined value.

\* \* \* \* \*